B. Irving,
Obtaining the Extract of Bark for Tanning,
No. 64,322. Patented Apr. 30, 1867.
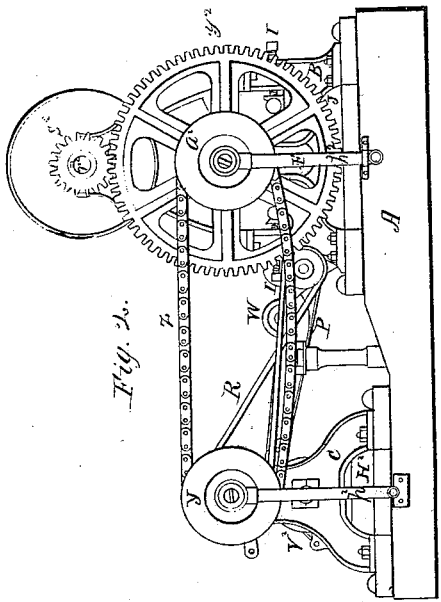
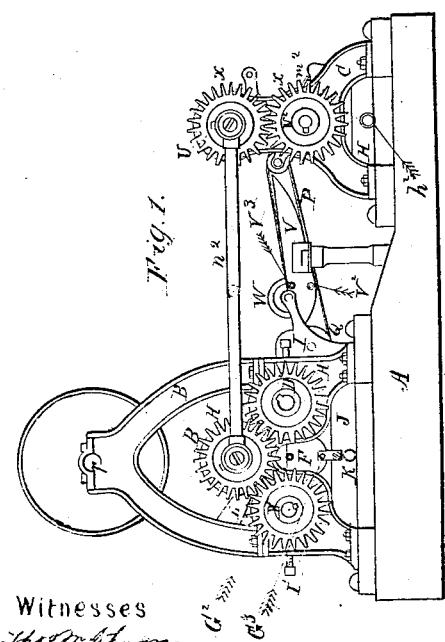
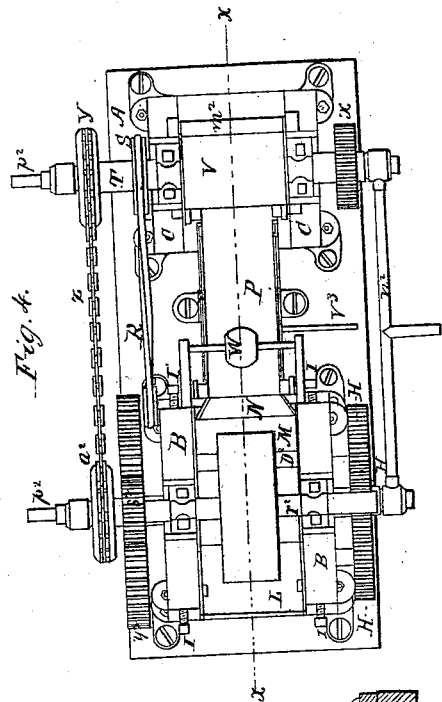
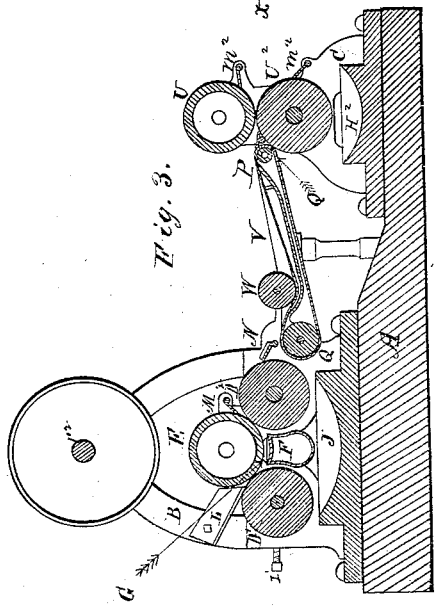
Witnesses
Inventor
Benjamin Irving

United States Patent Office.

BENJAMIN IRVING, OF NEW YORK, N. Y.

*Letters Patent No. 64,322, dated April 30, 1867.*

---

IMPROVED MACHINERY FOR OBTAINING THE EXTRACT OF BARK FOR TANNING AND OTHER PURPOSES.

---

*The Schedule referred to in these Letters Patent and making part of the same.*

---

TO ALL WHOM IT MAY CONCERN:

Be it known that I, BENJAMIN IRVING, of the city, county, and State of New York, have invented certain new and useful improvements in Machinery for Pressing Bark for Obtaining the Extract thereof for Tanning and other Purposes; and I do hereby declare that the following is a full description of the same.

The nature of my invention consists, first, in arranging and combining with three pressure-rollers a water bath or trough, so as to saturate the bark after passing between the impinging surfaces of the upper and first lower roller, and before being compressed again between the impinging surfaces of the upper and second lower roller, for the purpose of expelling the extractive matter of the bark; second, the combination and arrangement of a water pipe or pipes with the water bath or trough, for keeping a constant supply of water in it to saturate the bark in passing through the same; third, combining and arranging with the pressure-rollers a collecting trough, so as to receive all the extract as fast as expelled from the bark in passing between the rollers; fourth, in combining and arranging with the pressure-rollers an endless carrying-belt, of porous cloth or wire gauze, and water box, for the purpose of saturating the bark after leaving the first series of pressure-rollers, and before being delivered to the next series of rollers by the carrying-belt; fifth, in the combination and arrrangement of the endless belt and water-box with the two finishing pressure-rollers, for the purpose of expelling the watery extract from the bark; sixth, in combining with the upper pressure-rollers of the two series of rollers a steam pipe or pipes, for the purpose of heating the said upper pressure-rollers, and thereby cause the resinous or gummy constituents of the bark to combine more readily with the water.

But to describe my invention more particularly I will refer to the accompanying drawings, forming a part of this specification, the same letters of reference, wherever they occur, referring to like parts.

Figure 1 is a right-hand side view of the machine.
Figure 2 is a left-hand side view of the same.
Figure 3 is a longitudinal cut section of the machine through the line $x\ x$, fig. 4.
Figure 4 is a plan view of the machine.

Letter A is the bed, and B and C the frame of the machine elevated thereon. In the frame B are arranged, in suitable bearings on the same level, two metal rollers $D^1$ and $D^2$, and about eight inches, more or less, distant from each other. Immediately above the space between the rollers $D^1$ and $D^2$ is arranged, in suitable bearings, a third roller, E, of the same diameter as the lower rollers, upon the sides of which the roller E is intended to impinge the bark in passing between them. Underneath the roller E, and nearly filling the space between the lower rollers, is a water-trough, F, having a dish-shaped perforated top, G, so as to form a basin of water, in which the bark is re-soaked after its first compression between the sides of the rollers E and $D^1$, and also for the purpose of bending up or guiding the end of the slab of bark in between the impinging surfaces of the rollers E and $D^2$, to give the second compression to it. To keep up a constant supply of water to the trough a feed pipe, $G^2$, is inserted in the lower part of it, and in its upper part a waste pipe, $G^3$, so that, by a graduated supply, the trough will be kept always full. Letters H are a series of cog-wheels on the ends of the journals of the rollers E and $D^1$ and $D^2$, of equal size, for the purpose of giving a uniform speed to all of them. For the purpose of regulating the pressure of the rollers the journals of the rollers $D^1$ and $D^2$ are secured in sliding boxes, which, by means of set-screws I, passing through the frame, are adjusted to any amount of pressure required. Letter J is a collecting trough, arranged upon the bed of the machine, so as to receive the extract as it is expressed from the bark by the rollers E and $D^1$ and $D^2$, to facilitate which operation a suitable space is allowed between the sides of the trough F and the rollers $D^1$ and $D^2$. Letter K is a pipe for taking off the extract from the trough J. Letter L is a feed table, by which the slab of bark is introduced into the machine; and M is a scraper, adjusted at the back of the roller E to clear its surface of any gummy matter that may adhere to it; and N is another scraper, adjusted at back of the roller $D^2$ for the twofold purpose of clearing its surface and carrying the slab of bark to an endless apron, P, made of porous cloth or wire gauze, running over two carrying-rollers Q, propelled or rotated by a belt, R, running on a pulley, S, on the journal T of the upper roller U of the second series of pressure-rollers U and $U^2$. Letter V is an oblong water-box, which is kept constantly filled with water by a pipe, $V^2$, inserted into it near its bottom, and depleted of any excess by a pipe, $V^3$, near its upper edge, thereby keeping the box always full, but prevented from overflowing by the upper pipe. Through this water-box the upper half of the endless apron is carried, with the slab of bark thereon, which, by means of a depressing-roller, W, secured upon suitable bearings in the frame of the machine, depresses the bark below the surface of the water in the water-box, and thus causes it to be re-saturated, so as to dissolve more readily the extractive matter in it before being delivered to the second series of rollers. These rollers are arranged in suitable bearings in the frame C, and geared together by cog-wheels X on their journals, so that, by means of a pulley, Y, on the opposite end of the upper roller journal, and a chain belt, Z, running over a pulley, $a^2$, on the outer end of the journal of the roller E of the first series, a uniform speed is given to the several compressing-rollers. Underneath the second series of rollers (U and $U^2$) is a trough, $H^2$, secured to the bed of the machine for collecting the extract as expelled from the bark by the rollers; and $h^3$ is a pipe for discharging the extract from the trough. Letters $M^2$ are several scrapers, arranged in the frame of the machine so as to clean the surfaces of the rollers U and $U^2$. Letter $N^2$ is a steam pipe, connecting with the ends of the journals of the rollers E and U. These journals and rollers are hollow, the object of which is to allow of their being heated by a constant supply of steam, and thus, by means of pressure and heat, more readily disintegrate the fibre of the bark, and, at the same time, cause the water to absorb the extractive matter more freely than would be possible if only cold rollers were used. Letters $p^2$ are waste-water pipes, attached to the opposite ends of the said rollers' journals. Letter $r^2$ is a propelling-shaft, having on its end a small cog-wheel, $s^2$, which gears into a large cog-wheel, $y^3$, on the journal of the pressure-roller E, so that, by means of any suitable arrangement of belting applied to the pulleys on the shaft $r^2$, the machine will be set in motion.

Having now described my invention, I will proceed to set forth what I claim, and desire to secure by Letters Patent of the United States:

1. I claim the combination and arrangement of the rollers E and $D^1$ and $D^2$ with the trough F, substantially as hereinbefore described and for the purposes set forth.

2. I claim the combination of the pipes $G^2$ and $G^3$ with the water-trough F, for the purposes hereinbefore set forth.

3. I also claim the combination and arrangement of the rollers E and $D^1$ and $D^2$ with the water-box F and collecting trough J, for the purposes hereinbefore set forth.

4. I also claim, in combination with the rollers E, $D^1$, and $D^2$, the endless apron P and water-box V, for the purposes hereinbefore set forth.

5. I also claim, in combination with the endless apron P and water-box V, the pressure-rollers U and $U^2$, for the purposes hereinbefore set forth.

6. I also claim the combination of the rollers E and U with the steam pipe $N^2$, for the purposes hereinbefore set forth.

BENJAMIN IRVING.

Witnesses:
THOS. W. JOHNSON,
C. L. BARRITT.